US012524970B2

(12) United States Patent
Li

(10) Patent No.: US 12,524,970 B2
(45) Date of Patent: Jan. 13, 2026

(54) METHOD AND DEVICE OF VISUAL ASSISTANCE FOR USER IN EXTENDED REALITY ENVIRONMENT

(71) Applicant: HTC Corporation, Taoyuan (TW)

(72) Inventor: Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 346 days.

(21) Appl. No.: 18/165,345

(22) Filed: Feb. 7, 2023

(65) Prior Publication Data

US 2024/0265643 A1 Aug. 8, 2024

(51) Int. Cl.

*G06T 19/00* (2011.01)
*G06F 3/01* (2006.01)

(52) U.S. Cl.

CPC ........... *G06T 19/006* (2013.01); *G06F 3/012* (2013.01)

(58) Field of Classification Search

CPC .............................. G06T 19/006; G06F 3/011
See application file for complete search history.

(56) References Cited

U.S. PATENT DOCUMENTS

| | | | | |
|---|---|---|---|---|
| 2022/0101612 | A1* | 3/2022 | Palangie | G06T 19/006 |
| 2022/0197382 | A1* | 6/2022 | LeBeau | G06F 3/0304 |
| 2023/0316671 | A1* | 10/2023 | Zhang | G06V 10/7715<br>345/419 |

* cited by examiner

*Primary Examiner* — Matthew Salvucci
(74) *Attorney, Agent, or Firm* — JCIPRNET

(57) ABSTRACT

A method, an electronic device, and a non-transitory computer readable storage medium of visual assistance for a user in an extended reality environment are provided. The method includes: outputting an extended reality scene including a first virtual object and an interactive object; detecting the user; calculating a first distance between the interactive object and the user; and disabling the first virtual object in the extended reality scene in response to the first distance being greater than a first threshold.

17 Claims, 5 Drawing Sheets

10
300
200

METHOD AND DEVICE OF VISUAL ASSISTANCE FOR USER IN EXTENDED REALITY ENVIRONMENT

BACKGROUND

Technical Field

The disclosure relates to extended reality (XR) technology, and particularly related to a method, and electronic device, and a non-transitory computer readable storage medium of visual assistance for a user in an extended reality environment.

Description of Related Art

Along with the improvement of technology, head mounted device (HMD) become more and more popular. A head mounted device may create an extended reality environment for a user, and the user may interact with virtual objects shown in the extended reality scene provided by the extended reality environment. However, the virtual objects in the extended reality scene may obscure the user's sight. For example, when the user moves with the head mounted device on, the user may bump into a real wall since the user's sight is blocked by the virtual objects displayed by the head mounted device.

SUMMARY

The disclosure is directed to a method, an electronic device, and a non-transitory computer readable storage medium of visual assistance for a user in an extended reality environment.

The present invention is directed to an electronic device of visual assistance for a user in an extended reality environment. The electronic device includes: a display, an image capture device, and a processor. The display outputs an extended reality scene including a first virtual object and an interactive object. The processor is coupled to the display and the image capture device, wherein the processor is configured to: detect the user by the image capture device; calculate a first distance between the interactive object and the user; and disable the first virtual object in the extended reality scene in response to the first distance being greater than a first threshold.

The present invention is directed to a method of visual assistance for a user in an extended reality environment. The method includes: outputting an extended reality scene including a first virtual object and an interactive object; detecting the user; calculating a first distance between the interactive object and the user; and disabling the first virtual object in the extended reality scene in response to the first distance being greater than a first threshold.

The present invention is directed to a non-transitory computer readable storage medium of visual assistance for a user in an extended reality environment. The non-transitory computer readable storage medium records an executable computer program to be loaded by an electronic device to perform: outputting an extended reality scene including a first virtual object and an interactive object; detecting a user; calculating a first distance between the interactive object and the user; and disabling the first virtual object in the extended reality scene in response to the first distance being greater than a first threshold.

Based on the above description, the present invention may disable the virtual objects in the extended reality scene while the user is moving, so as to prevent the user's sight from being blocked.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
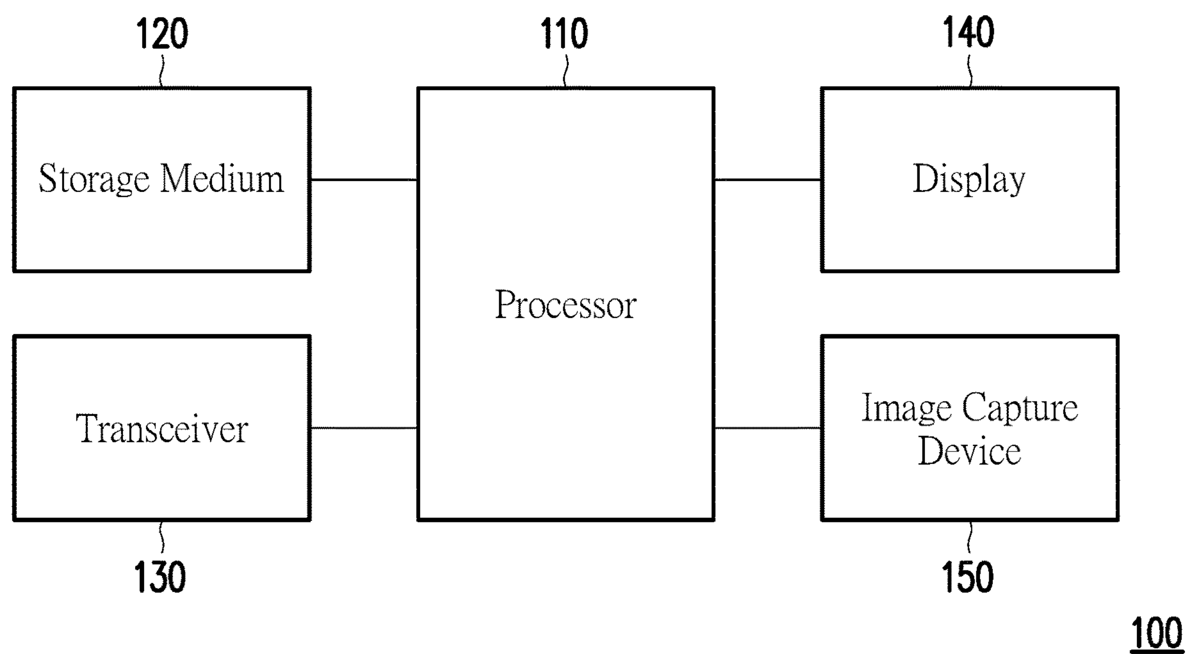
FIG. 1 illustrates a schematic diagram of an electronic device of visual assistance for a user in an extended reality environment according to one embodiment of the present invention.

FIG. 1 illustrates a schematic diagram of an electronic device 100 of visual assistance for a user in an extended reality environment according to one embodiment of the present invention. The electronic device 100 may be, for example, a head mounted device which may be used for providing extended reality environment such as a virtual reality (VR) environment, an augmented reality (AR) environment, or a mixed reality (MR) environment for the user. The electronic device 100 may include a processor 110, a storage medium 120, a transceiver 130, a display 140, and an image capture device 150.

The processor 110 may be, for example, a central processing unit (CPU), or other programmable general purpose or special purpose micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar device or a combination of the above devices. The processor 110 may be coupled to the storage medium 120, the transceiver 130, the display 140, and the image capture device 150.

The storage medium 120 may be, for example, any type of fixed or removable random access memory (RAM), a read-only memory (ROM), a flash memory, a hard disk drive (HDD), a solid state drive (SSD) or similar element, or a combination thereof. The storage medium 120 may be a non-transitory computer readable storage medium configured to record a plurality of executable computer programs, modules or applications to be loaded by the processor 110 to perform the functions of the electronic device 100.

The transceiver 130 may be configured to transmit or receive wired/wireless signals. The transceiver 130 may also perform operations such as low noise amplifying, impedance matching, frequency mixing, up or down frequency conversion, filtering, amplifying, and so forth. The processor 110 may communicate with other devices via the transceiver 130. For example, the processor 110 may receive user's command from an input device (e.g., a keyboard or a mouse) via the transceiver 130.

The display 140 may be used for displaying video data or image data such as an extended reality scene of the extended reality environment. The display 140 may include a liquid-crystal display (LCD) display or an organic light-emitting diode (OLED) display. In one embodiment, the display 140 may provide an image beam to the eye of the user to form the image on the retinal of the user such that the user may see an extended reality scene created by the electronic device 100.

The image capture device 150 may be a camera or a photographic device for capturing images. The image capture device 150 may include an image sensor such as a complementary metal oxide semiconductor (CMOS) or a charge coupled device (CCD) sensor.

An extended reality scene may include one or more real objects or virtual objects. When the user wears a head mounted device (e.g., electronic device 100), the sight of the user may be obscured by some virtual objects. If the user is moving, the user's sight be obscured may pose a great danger to the user. For example, if the extended reality scene simulates a meeting room, the extended reality scene may include virtual objects such as images of the meeting participants. To solve this problem, the present invention discloses a way to improve the safety of the user immersed in an extended reality environment.

The display 140 may output an extended reality scene for the user, wherein the extended reality scene may include one or more real objects, virtual objects, interactive objects, or supports. An interactive object may be a real object or a virtual object. The user may interact with the extended reality scene by operating the interactive object. The extended reality scene may be updated according to the operation on the interactive object. For example, an extended reality scene may show the contents of a text file for the user in the form of a virtual object in the extended reality scene. The user may edit the text file by operating the interactive object in the virtual reality scene, wherein the interactive object may be a virtual keyboard provided by the extended reality environment or a real keyboard. The content of the text file shown to the user may be updated according to the user's operation on the keyboard.

One or more interactive objects may be disposed on a support, wherein the support may be a real object or a virtual object. For example, if the interactive object is a real keyboard, the support may be a real desk. If the interactive object is a virtual keyboard provided by the extended reality environment, the support may be a virtual desk provided by the extended reality environment or a real desk fixed in the real world.

The processor 110 may output an extended reality scene for the user through the display 140, wherein the extended reality scene may provide one or more virtual objects, real objects, interactive objects, or supports for the user. In one embodiment, the processor 110 may identify virtual objects, real objects, interactive objects, or supports based on object detection algorithm. If the user leaves an interactive object, the processor 110 may determine that the user wants to stop working and move to somewhere. Since the virtual objects in the extended reality scene may block the user's sight, the processor 110 may disable the virtual objects in consideration of the user's safety or may switch the electronic device 100 from a working mode to a pass-through mode.

Figure 2:
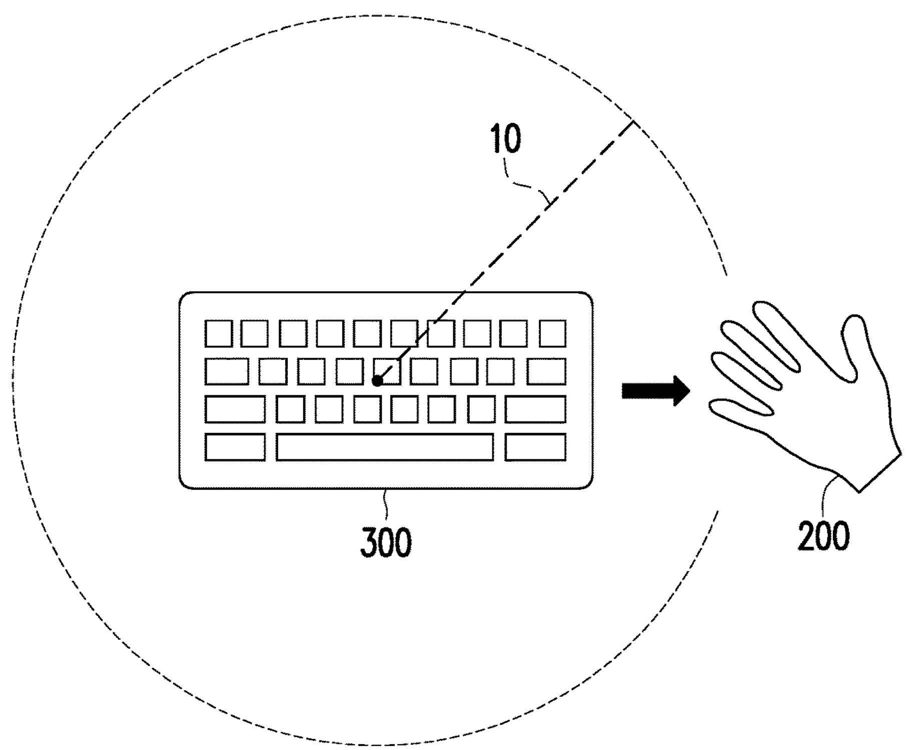
FIG. 2 illustrates a schematic diagram of the user leaving the interactive object according to one embodiment of the present invention.

FIG. 2 illustrates a schematic diagram of the user 200 leaving the interactive object 300 according to one embodiment of the present invention. The user 200 may represent any body part of a user. For example, the user 200 may include a hand of a user. The interactive object 300 may bean user input device which can interact with the extended reality scene, such as a virtual keyboard or a real keyboard. The processor 110 may detect the user 200 (or may detect the interactive object 300 if the interactive object 300 is a real object) by the image capture device 150. More specifically, the processor 110 may detect the user 200 by performing an object detection on the extended reality scene. After that, the processor 110 may calculate the distance between the interactive object 300 and the user 200. If the distance between the interactive object 300 and the user 200 is greater than a threshold 10, the processor 110 may disable the virtual object in the extended reality scene. That is, the processor 110 may make the virtual object disappear from the extended reality scene. Since the virtual object in the extended reality scene has disappeared, the user 200 may walk in the real world without taking off the head mounted device (i.e., the electronic device 100). In one embodiment, if the distance between the interactive object 300 and the user 200 is greater than the threshold 10, the processor 110 may switch the electronic device 100 from the working mode to the pass-through mode. When the electronic device 100 is in the pass-through mode, the virtual object blocking the user's sight may be disabled or may disappear, only the object (e.g., real object or virtual object) not blocking the user's sight, the real object captured by the image capture device 150, or the virtual object associated with the real object captured by the image capture device 150 may appear in the extended reality scene. For example, when the electronic device 100 is in the pass-through mode, the extended reality scene may include the real world image captured by the image capture device 150 (e.g., a walkway in the real world) or may include the virtual object correlated with the real world image captured by the image capture device 150 (e.g., a virtual walkway generated according to the image captured by the image capture device 150).

On the other hand, if the user approaches specific interactive object, the processor 110 may determine that the user wants to stop walking and start operating the interactive object. Accordingly, the processor 110 may enable the virtual objects in the extended reality scene to simulate a particular environment (e.g., a meeting room) for the user or may switch the electronic device 100 from the pass-through mode to the working mode.

Figure 3:
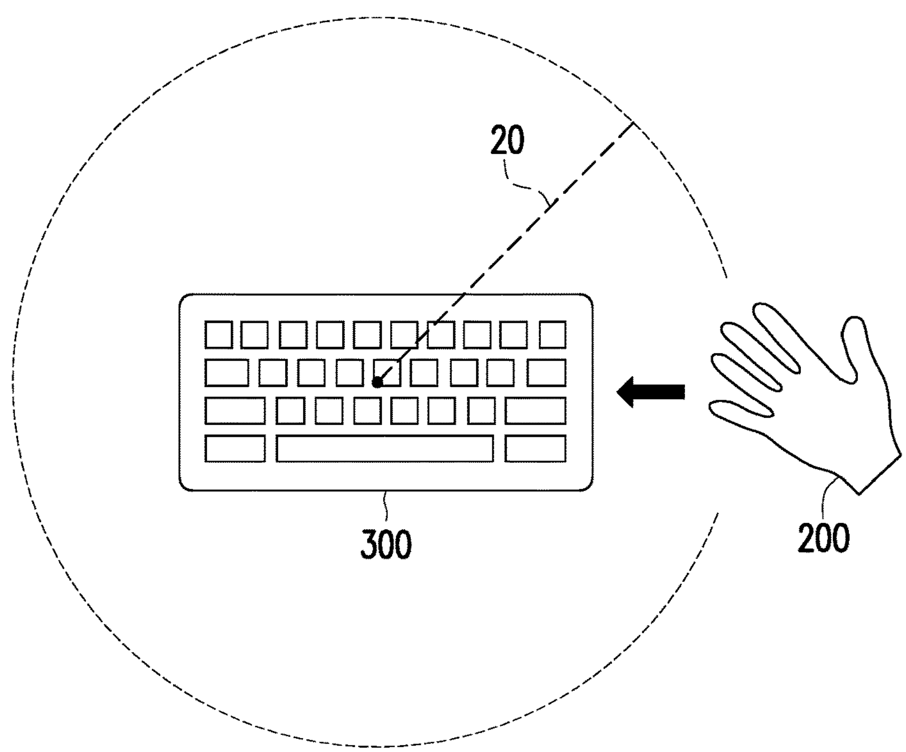
FIG. 3 illustrates a schematic diagram of the user approaching the interactive object according to one embodiment of the present invention.

FIG. 3 illustrates a schematic diagram of the user 200 approaching the interactive object 300 according to one embodiment of the present invention. The processor 110 may calculate the distance between the interactive object 300 and the user 200. If the distance between the interactive object 300 and the user 200 is less than or equal to a threshold 20, the processor 110 may enable the virtual object in the extended reality scene. That is, the processor 110 may make the virtual object appear to the extended reality scene. For example, the processor 110 may enable a virtual display for the user if the distance between the user 200 and the interactive object 300 is less than or equal to the threshold 20. In one embodiment, if the distance between the interactive object 300 and the user 200 is less than or equal to the threshold 20, the processor 110 may switch the electronic device 100 from the pass-through mode to the working mode. When the electronic device 100 is in the working mode, the virtual object related to user's work may be enabled or may appear. For example, when the electronic device 100 is in the working mode, a virtual meeting room and the virtual avatars of the meeting participants may be enabled (i.e., appear in the extended reality scene).

In some cases, the interactive object 300 may be carried by the user 200. If the interactive object 300 is carried away from a specific support (e.g., the support for placing the interactive object 300), the processor 110 may determine that the user 200 wants to stop working and move to somewhere. Accordingly, the processor 110 may disable the virtual object in the extended reality scene or may switch the electronic device 100 from the working mode to a pass-through mode.

Figure 4:
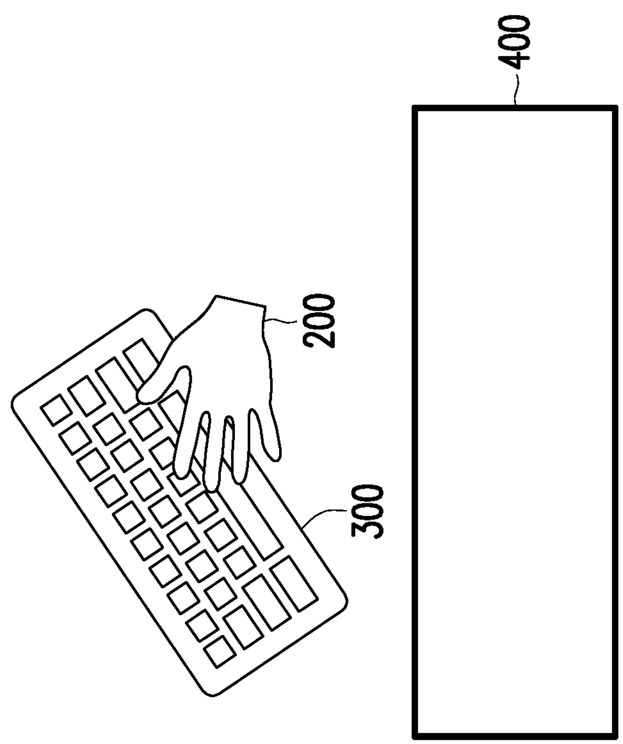
FIG. 4 illustrates a schematic diagram of the interactive object leaving the support according to one embodiment of the present invention.
Figure 4:
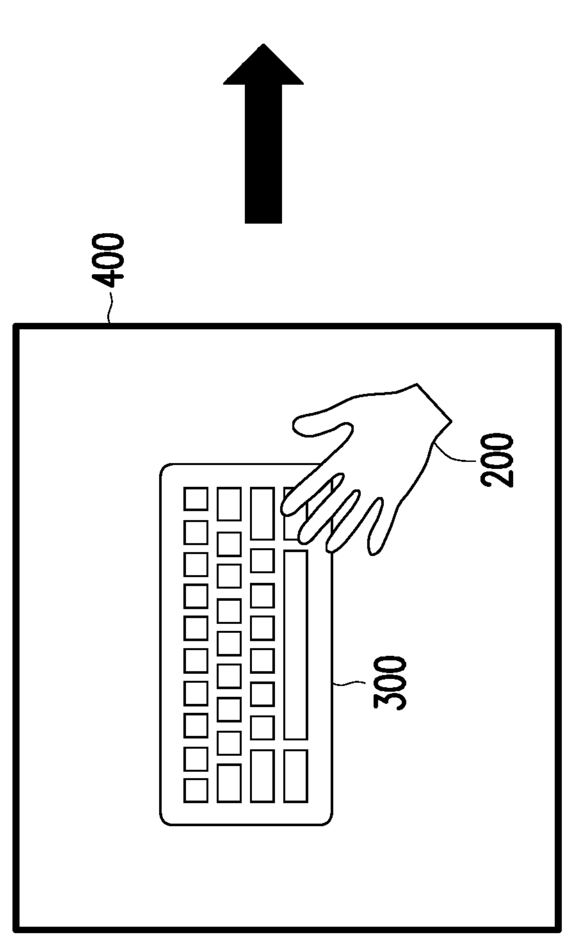

FIG. 4 illustrates a schematic diagram of the interactive object 300 leaving the support 400 according to one embodiment of the present invention. The interactive object 300 may be, for example, a virtual keyboard or a real keyboard. The support 400 may be, for example, a virtual desk or a real desk. If the support 400 is a real object, the processor 110 may detect the support 400 by the image capture device 150. More specifically, the processor 110 may detect the support 400 by perform an object detection on the extended reality scene. After that, the processor 110 may calculate the distance between the interactive object 300 and the support 400. If the distance between the interactive object 300 and the support 400 is greater than a threshold, the processor 110 may determine that the interactive object 300 is taken away from the support 400. Accordingly, the processor 110 may disable the virtual object in the extended reality scene. That is, the processor 110 may make the virtual object disappear from the extended reality scene. In one embodiment, if the distance between the interactive object 300 and the support 400 is greater than the threshold, the processor 110 may switch the electronic device 100 from the working mode to the pass-through mode.

On the other hand, if the interactive object 300 approach to a specific support, the processor 110 may determine that the user 200 wants to stop walking and start operating the interactive object 300. Accordingly, the processor 110 may enable the virtual object in the extended reality scene or may switch the electronic device 100 from the pass-through mode to the working mode.

Figure 5:
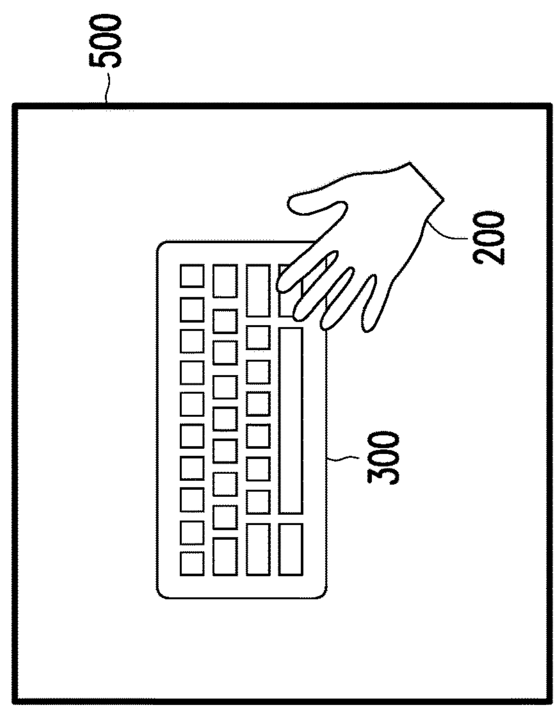
FIG. 5 illustrates a schematic diagram of the interactive object approaching the support according to one embodiment of the present invention.
Figure 5:
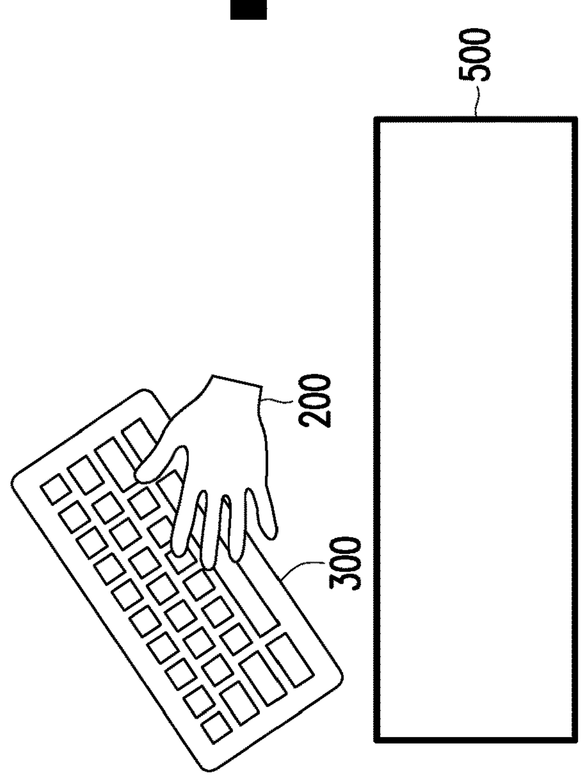

FIG. 5 illustrates a schematic diagram of the interactive object 300 approaching the support 500 according to one embodiment of the present invention. The interactive object 300 may be, for example, a virtual keyboard or a real keyboard. The support 500 may be, for example, a virtual desk or a real desk. If the support 500 is a real object, the processor 110 may detect the support 500 by the image capture device 150. More specifically, the processor 110 may detect the support 500 by perform an object detection on the extended reality scene. After that, the processor 110 may calculate the distance between the interactive object 300 and the support 500. If the distance between the interactive object 300 and the support 500 is less than or equal to a threshold, the processor 110 may determine that the interactive object is placed on the support 500. Accordingly, the processor 110 may enable the virtual object in the extended reality scene. That is, the processor 10 may make the virtual object appear to the extended reality scene. In one embodiment, if the distance between the interactive object 300 and the support 500 is less than or equal to the threshold, the processor 110 may switch the electronic device 100 from the pass-through mode to the working mode.

Figure 6:
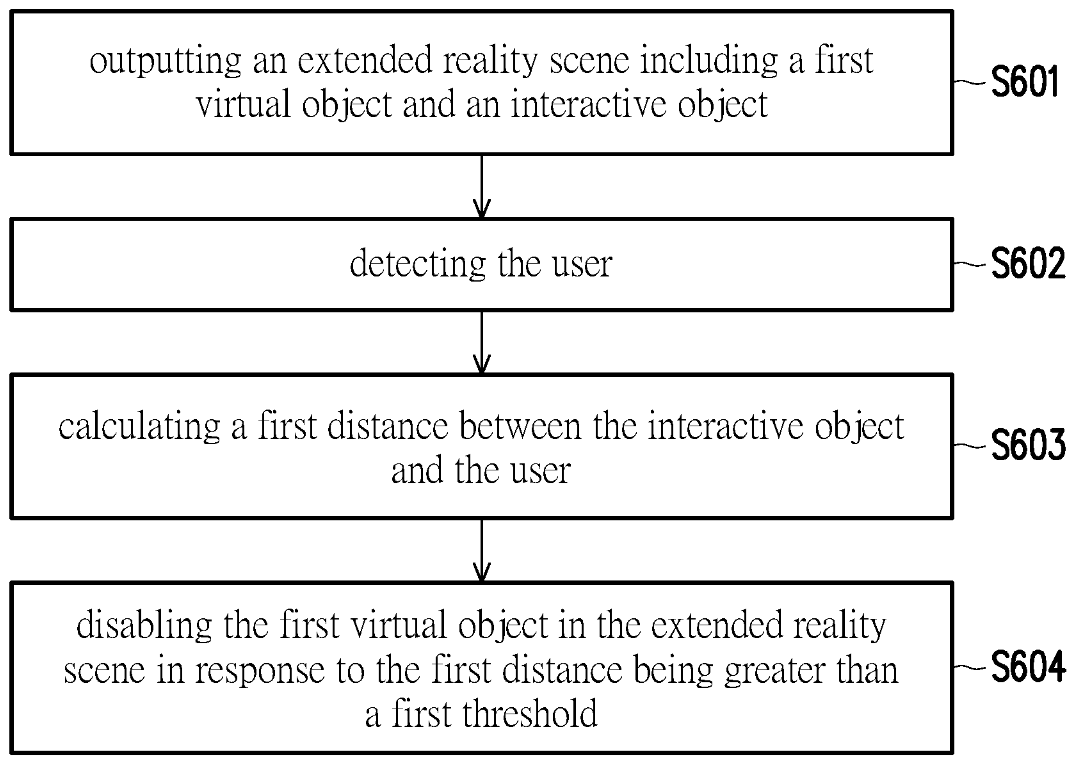
FIG. 6 illustrates a flowchart of a method of visual assistance for a user in an extended reality environment according to one embodiment of the present invention.

FIG. 6 illustrates a flowchart of a method of visual assistance for a user in an extended reality environment according to one embodiment of the present invention, wherein the method may be implemented by the electronic device 100 as shown in FIG. 1. In step S601, outputting an extended reality scene including a first virtual object and an interactive object. In step S602, detecting the user. In step S603, calculating a first distance between the interactive object and the user. In step S604, disabling the first virtual object in the extended reality scene in response to the first distance being greater than a first threshold.

In summary, the electronic device of the present invention may measure a distance between a user and an interactive object in the extended reality environment and determine if the user is approaching or leaving the interactive object. If the user is leaving the interactive object, the electronic device may determine that the user is about to move and may disable the virtual objects which could possibly obscure user's sight. Accordingly, the safety of the movement of the user can be guarantee. In the other hand, if the user is approaching the interactive object, the electronic device may determine that the user wants to start working by using the interactive object. Accordingly, the electronic device may enable the virtual objects in the extended reality environment so as to create a workspace for the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device of visual assistance for a user in an extended reality environment, comprising:

a display, outputting an extended reality scene comprising a first virtual object and an interactive object different from the first virtual object, wherein the interactive object is a user input object which can interact with the extended reality scene and the user interacts with the extended reality scene by operating the interactive object;

an image capture device; and a processor, coupled to the display and the image capture device, wherein the processor is configured to:

detect the user by the image capture device;

calculate a first distance between the interactive object and the user;

disable the first virtual object different from the interactive object and enable a pass-through mode to provide a real world image captured by the image capture device in the extended reality scene in response to the first distance being greater than a first threshold, and enable the first virtual object in the extended reality scene in response to the first distance being less than or equal to a second threshold.

2. The electronic device as claimed in claim 1, wherein the processor further configured to:

calculate a second distance between a first support and the interactive object; and disable the first virtual object in the extended reality scene in response to the second distance being greater than a third threshold.

3. The electronic device as claimed in claim 2, wherein the processor further configured to:
calculate a third distance between a second support and the interactive object; and
enable the first virtual object in the extended reality scene in response the third distance being less than or equal to a fourth threshold.

4. The electronic device as claimed in claim 2, wherein the first support comprises one of a real object and a second virtual object.

5. The electronic device as claimed in claim 1, wherein the processor further configured to:
update the extended reality scene according to an operation on the interactive object.

6. The electronic device as claimed in claim 1, wherein the interactive object comprises one of a real object and a second virtual object.

7. A method of visual assistance for a user in an extended reality environment, comprising:
outputting an extended reality scene comprising a first virtual object and an interactive object different from the first virtual object, wherein the interactive object is a user input object which can interact with the extended reality scene and the user interacts with the extended reality scene by operating the interactive object;
detecting the user;
calculating a first distance between the interactive object and the user;
disabling the first virtual object different from the interactive object and enabling a pass-through mode to provide a real world image captured by the image capture device in the extended reality scene in response to the first distance being greater than a first threshold,
enabling the first virtual object in the extended reality scene in response to the first distance being less than or equal to a second threshold.

8. The method as claimed in claim 7, further comprising:
calculating a second distance between a first support and the interactive object;
disable the first virtual object in the extended reality scene in response to the second distance being greater than a third threshold.

9. The method as claimed in claim 8, further comprising:
calculating a third distance between a second support and the interactive object;
enable the first virtual object in the extended reality scene in response to the third distance being less than or equal to a fourth threshold.

10. The method as claimed in claim 8, wherein the first support comprises one of a real object and a virtual object.

11. The method as claimed in claim 7, further comprising:
updating the extended reality scene according to an operation on the interactive object.

12. The method as claimed in claim 7, wherein the interactive object comprises one of a real object and a second virtual object.

13. A non-transitory computer readable storage medium of visual assistance for a user in an extended reality environment, recording an executable computer program to be loaded by an electronic device to perform:
outputting an extended reality scene comprising a first virtual object and an interactive object different from the first virtual object, wherein the interactive object is a user input object which can interact with the extended reality scene and the user interacts with the extended reality scene by operating the interactive object;
detecting a user;
calculating a first distance between the interactive object and the user;
disabling the first virtual object different from the interactive object and enabling a pass-through mode to provide a real world image captured by the image capture device in the extended reality scene in response to the first distance being greater than a first threshold,
enabling the first virtual object in the extended reality scene in response to the first distance being less than or equal to a second threshold.

14. The non-transitory computer readable storage medium as claimed in claim 13, wherein the computer program is loaded by the electronic device to further perform:
calculating a second distance between a first support and the interactive object;
disable the first virtual object in the extended reality scene in response to the second distance being greater than a third threshold.

15. The non-transitory computer readable storage medium as claimed in claim 14, wherein the computer program is loaded by the electronic device to further perform:
calculating a third distance between a second support and the interactive object;
enable the first virtual object in the extended reality scene in response to the third distance being less than or equal to a fourth threshold.

16. The non-transitory computer readable storage medium as claimed in claim 13, wherein the computer program is loaded by the electronic device to further perform:
updating the extended reality scene according to an operation on the interactive object.

17. The non-transitory computer readable storage medium as claimed in claim 13, wherein the interactive object comprises one of a real object and a second virtual object.

* * * * *